United States Patent
Tang et al.

(10) Patent No.: US 8,521,031 B2
(45) Date of Patent: Aug. 27, 2013

(54) OPTICAL TRANSCEIVER MODULES AND SYSTEMS AND OPTICAL TRANSCEIVING METHODS

(75) Inventors: Jinkuan Tang, Beijing (CN); Jiin Lai, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 270 days.

(21) Appl. No.: 12/950,122

(22) Filed: Nov. 19, 2010

(65) Prior Publication Data

US 2011/0255873 A1    Oct. 20, 2011

(30) Foreign Application Priority Data

Apr. 19, 2010  (CN) .......................... 2010 1 0153054

(51) Int. Cl.
*H04B 10/02*    (2011.01)
*H04B 1/00*    (2006.01)
*G02B 6/26*    (2006.01)

(52) U.S. Cl.
USPC ............... 398/136; 398/88; 398/135; 385/88; 385/92

(58) Field of Classification Search
USPC .................................................. 398/135, 136
See application file for complete search history.

(56) References Cited

U.S. PATENT DOCUMENTS

| | | | |
|---|---|---|---|
| 7,581,890 B2 | 9/2009 | Crew | |
| 2003/0095303 A1* | 5/2003 | Cunningham et al. | 359/110 |
| 2006/0285803 A1* | 12/2006 | Crews | 385/88 |
| 2006/0291786 A1* | 12/2006 | Kiely et al. | 385/92 |
| 2007/0141992 A1* | 6/2007 | Kwa et al. | 455/63.1 |

FOREIGN PATENT DOCUMENTS

| | | |
|---|---|---|
| CN | 1424641 | 6/2003 |
| CN | 1462014 | 12/2003 |
| CN | 2872747 | 2/2007 |

OTHER PUBLICATIONS

Alan Cross ["Primary science p. 247"].*
English language translation of abstract of CN 1424641 (published Jun. 18, 2003).
English language translation of abstract of CN 1462014 (published Dec. 17, 2003).
English language translation of abstract of CN 2872747 (published Feb. 21, 2007).

* cited by examiner

*Primary Examiner* — Shi K Li
*Assistant Examiner* — Oommen Jacob
(74) *Attorney, Agent, or Firm* — McClure, Qualey & Rodack, LLP (57) ABSTRACT

An optical transceiver module includes a receiving unit, a transmission driving unit, and a terminal control unit. The receiving unit outputs a receiver lost signal. The transmission driving unit includes a positive receiving signal terminal and a negative receiving signal terminal. The terminal control unit is coupled between the positive receiving signal terminal and the negative receiving signal terminal. The terminal control unit controls whether a differential terminator impedance is coupled between the positive receiving signal terminal and the negative receiving signal terminal according to the receiver lost signal.

10 Claims, 7 Drawing Sheets

OPTICAL TRANSCEIVER MODULES AND SYSTEMS AND OPTICAL TRANSCEIVING METHODS

CROSS REFERENCE TO RELATED APPLICATIONS

This application claims the benefit of China application Ser. No. 201010153054.3 filed Apr. 19, 2010, the subject matter of which is incorporated herein by reference.

BACKGROUND OF THE INVENTION

1. Field of the Invention

The invention relates to an optical transceiver module and system and an optical transceiving method, and more particularly to an optical transceiver module and system and an optical transceiving method for accurately detecting a terminal apparatus.

2. Description of the Related Art

As optical transmission techniques develop, optical transceiver modules have been applied more widely as optical fiber transmission has transmission rate/transmission distance benefits and anti-interference capabilities. Due to optical transmission technique advantages, more applications are being connected to an optical transceiver module with a current electronic transceiver. The current electronic transceivers with conventional interface specifications, such as a PCI-e (peripheral controller interface-express) interface specification or a USB 3.0 interface specification, can communicate with terminal apparatuses through an optical transceiver module. However, when a current optical transceiver module is directly coupled to a current electronic transceiver with a normal interface specification, the current electronic transceiver may be triggered to enter into a disable mode. Thus, it is desired to provide an optical transceiver module and system which solves the above problems.

BRIEF SUMMARY OF THE INVENTION

An exemplary embodiment of an optical transceiver module includes a receiving unit, a transmission driving unit, and a terminal control unit. The receiving unit outputs a receiver lost signal. The transmission driving unit includes a positive receiving signal terminal and a negative receiving signal terminal. The terminal control unit is coupled between the positive receiving signal terminal and the negative receiving signal terminal. The terminal control unit controls whether a differential terminator impedance is coupled between the positive receiving signal terminal and the negative receiving signal terminal according to the receiver lost signal.

An exemplary embodiment of an optical transceiver system includes an electronic transceiver and an optical transceiver module. The electronic transceiver includes a positive transmitting signal terminal and a negative transmitting signal terminal. The optical transceiver module is capable of being coupled to the electronic transceiver and includes a receiving unit, a transmission driving unit, and a terminal control unit. The receiving unit outputs a receiver lost signal. The transmission driving unit includes a positive receiving signal terminal and a negative receiving signal terminal which are coupled to the positive transmitting signal terminal and the negative transmitting signal terminal, respectively. The terminal control unit is coupled between the positive receiving signal terminal and the negative receiving signal terminal. The terminal control unit controls whether a differential terminator impedance is coupled between the positive receiving signal terminal and the negative receiving signal terminal according to the receiver lost signal.

An exemplary embodiment of an optical transceiving method for an optical transceiver system is provided. The optical transceiver system includes an electronic transceiver and an optical transceiver module. The electronic transceiver communicates with a terminal device through the optical transceiver module. The optical transceiving method includes the steps of: outputting a receiver lost signal according to a state of the terminal device; and controlling whether a differential terminator impedance is coupled between a positive receiving signal terminal and a negative receiving signal terminal of the optical transceiver module according to the receiver lost signal.

According to the optical transceiver module and system and the optical transceiving method of the embodiments, controlling a differential terminator impedance to be dynamically coupled between the positive and negative receiving signal terminals of the optical transceiver module according to the connection status of the terminal device can be accomplished on the inside of the optical transceiver module. Further, according to the coupling of the differential terminator impedance, the electronic transceiver in the host can accurately obtain the connection status of the terminal device coupled to the end of the optical cable. Through the optical transceiver module and the system of the embodiments, electronic transceivers which are originally not coupled to an optical transceiver can perform optical fiber communication with a terminal device, and the terminal device can perform a hot plugging function. According to the embodiments, the original interface design of the electronic transceiver in the host is not required to be changed. In the optical transceiver module in the embodiments, since the receiver lost signal is an internal signal, it is not required to design a pin to output the receiver lost signal externally from the interface of the optical transceiver module, thereby decreasing the pin count of the optical transceiver module.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
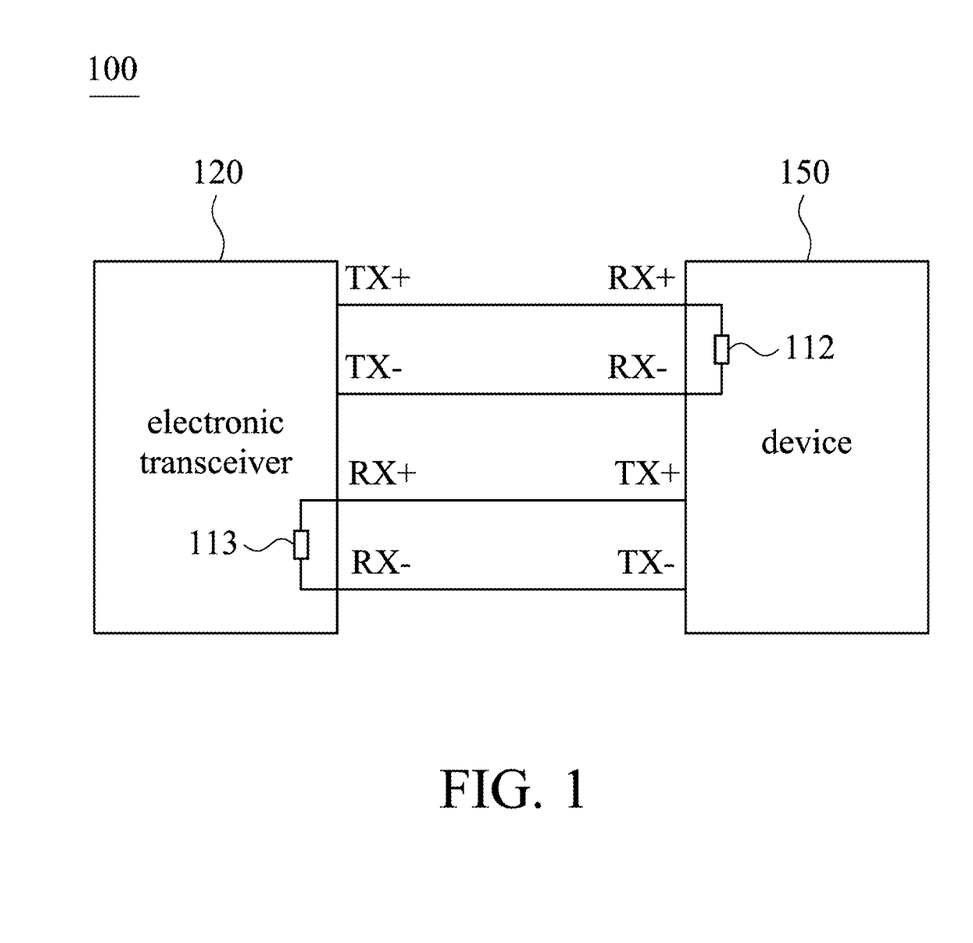
FIG. 1 is a block diagram of an electronic transceiver system.

FIG. 1 is a block diagram of an electronic transceiver system 100. In the electronic transceiver system 100, an electronic transceiver 120 may be a high-speed electronic transceiver which has a PCI-e (peripheral controller interface-express) interface or a USB 3.0 interface and supports a hot plugging function. When the electronic transceiver 120 operates as a host of the electronic transceiver system, the electronic transceiver 120 performs polling in a predetermined time period to detect whether a device has been inserted. When the electronic transceiver 120 detects that a device 150 has been inserted, the electronic transceiver 120 issues a link training sequence to build a link to the device 150. Also, the device 150 performs polling to detect whether a host is present. When the device 150 detects that the electronic transceiver 120 is present, the device 150 also issues a link training sequence to build a link to the electronic transceiver 120.

The connection between the electronic transceiver 120 and the device 150 is shown in FIG. 1. A positive transmitting signal terminal TX+ and a negative transmitting signal terminal TX− of the electronic transceiver 120 are coupled to a positive receiving signal terminal RX+ and a negative receiving signal terminal RX− of the device 150, respectively, so that data may be sent from the electronic transceiver 120 to the device 150. The data sent from the electronic transceiver 120 to the device 150 can be sent in a form of a differential signal pair. A positive receiving signal terminal RX+ and a negative receiving signal terminal RX− of the electronic transceiver 120 are coupled to a positive transmitting signal terminal TX+ and a negative transmitting signal terminal TX− of the device 150, respectively, so that data may be sent from the device 150 to the electronic transceiver 120. The data sent from the device 150 to the electronic transceiver 120 can be sent in a form of a differential signal pair. The electronic transceiver 120 performs polling to detect whether there is a differential terminator impedance coupled between the positive transmitting signal terminal TX+ and the negative transmitting signal terminal TX− of the electronic transceiver 120 to determine whether a device has been inserted according to the detection result. When the device 150 is coupled to the electronic transceiver 120 as shown in FIG. 1 and ready for data transmission, a differential terminator impedance 112 is coupled between the positive receiving signal terminal RX+ and the negative receiving signal terminal RX− of the device 150. The electronic transceiver 120 detects that there is a differential terminator impedance, which is, the differential terminator impedance 112, coupled between the positive transmitting signal terminal TX+ and the negative transmitting signal terminal TX− of the electronic transceiver 120, for the electronic transceiver 120 to determine that the device 150 has been inserted. The electronic transceiver 120 then issues a link training sequence to build a link to the device 150. Also, the device 150 performs polling to detect whether there is a differential terminator impedance coupled between the positive transmitting signal terminal TX+ and the negative transmitting signal terminal TX− of the device 150 to determine whether the device 150 is coupled to the electronic transceiver 120.

However, in current techniques, the device 150 of certain types, such as the device 150 coupled to the electronic transceiver 120 through an optical transceiver module, has some problems when it is coupled to the electronic transceiver 120. Since the optical transceiver module inherently has a differential terminator impedance, when the optical transceiver module is coupled to the electronic transceiver 120 by the connection between the device 150 and the electronic transceiver 120 as shown in FIG. 1, the electronic transceiver 120 detects that there is a differential terminator impedance coupled between the positive transmitting signal terminal TX+ and the negative transmitting signal terminal TX− of the electronic transceiver 120 and determines that a device has been inserted. Thus, the electronic transceiver 120 issues a link training sequence. At this time, however, one other terminal of the optical cable having the other terminal coupled to the optical transceiver module may not be coupled to a device or the device may not be ready for data transmission. Thus, the building of the link training sequence fails, and the electronic transceiver 120 serving as a host then enters into a disable mode.

Thus, in current techniques, an electronic transceiver with normal interface specification can not be coupled to a device through an optical transceiver module to build an optical fiber communication network.

Figure 2:
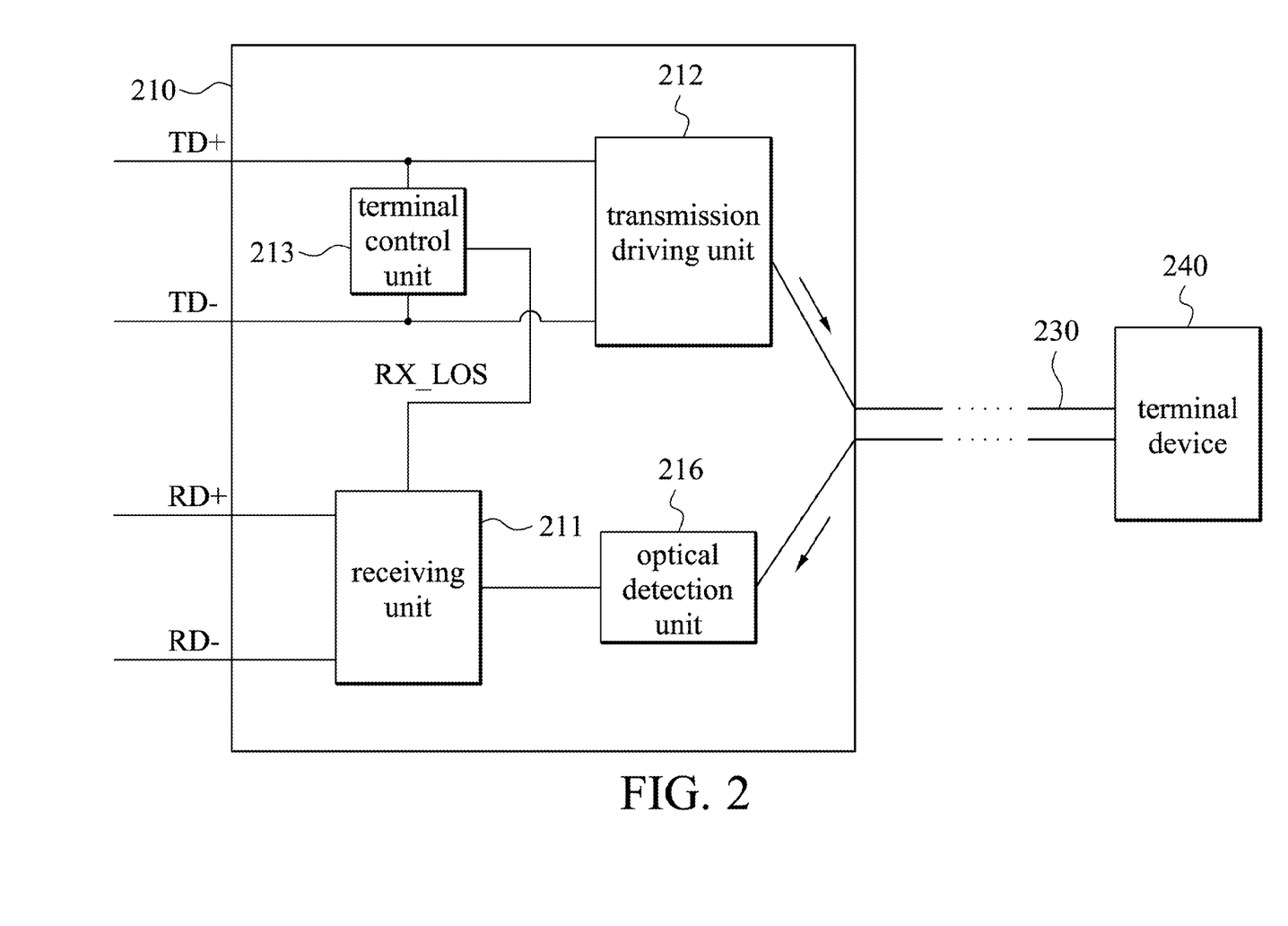
FIG. 2 shows an exemplary embodiment of an optical transceiver module.

FIG. 2 shows an exemplary embodiment of an optical transceiver module. An optical transceiver module 120 includes a receiving unit 211, a transmission driving unit 212, and a terminal control unit 213. The receiving unit 211 outputs a receiver lost signal RX_LOS. The transmission driving unit 212 includes a positive receiving signal terminal TD+ and a negative receiving signal terminal TD− to receive signals from a host. The terminal control unit 213 is coupled between the positive receiving signal terminal TD+ and the negative receiving signal terminal TD− and controls whether a differential terminator impedance is coupled between the positive receiving signal terminal TD+ and the negative receiving signal terminal TD− according to the receiver lost signal RX_LOS. The differential terminator impedance is formed, for example, by coupling of the positive receiving signal terminal TD+ to a reference potential through a terminator impedance and also coupling of the negative receiving signal terminal TD− to the reference potential through a terminator impedance. The reference potential may be a ground, as an example. The terminator impedance may include a capacitor, a resistor, or an inductor. The optical transceiver module 210 may be coupled to a terminal device 240 through an optical cable 230.

The optical transceiver module 210 further includes an optical detection unit 216 which is coupled to the receiving unit 211. In the embodiment, the optical detection unit 216 can be included in the receiving unit 211. The optical detection unit 216 detects an optical signal from the terminal device 240. The optical detection unit 216 converts the optical signal to an electronic signal and outputs the electronic signal to the receiving unit 211. When the terminal device 240 is coupled to the optical transceiver module 210 through the optical cable 230 and ready for data transmission, the optical detection unit 216 receives an optical receiving signal transmitted from the terminal device 240, converts the optical receiving signal to an electronic receiving signal, and transmits the electronic receiving signal to the receiving unit 211. Accordingly, the receiver lost signal RX_LOS output from the receiving unit 211 is de-asserted. When the terminal device 240 is not coupled to the optical transceiver module 21 or the terminal device 240 is not ready for data transmission, the optical detection unit 216 can not receive an optical receiving signal from the terminal device 240 correctly. At this time, the receiver lost signal RX_LOS output from the receiving unit 211 is asserted. However, current electronic transceivers, such as high-speed electronic transceivers with a PCI-e interface or a USB 3.0 interface, do not include an input terminal for receiving the receiver lost signal RX_LOS. Thus, the optical transceiver module 210, coupled to an electronic transceiver, can not notify the electronic transceiver as whether the terminal device 240 is coupled to the optical transceiver module 21 and ready for data transmission (for example, the terminal device 240 is powered on and ready to receive and transmit data).

Figure 7:
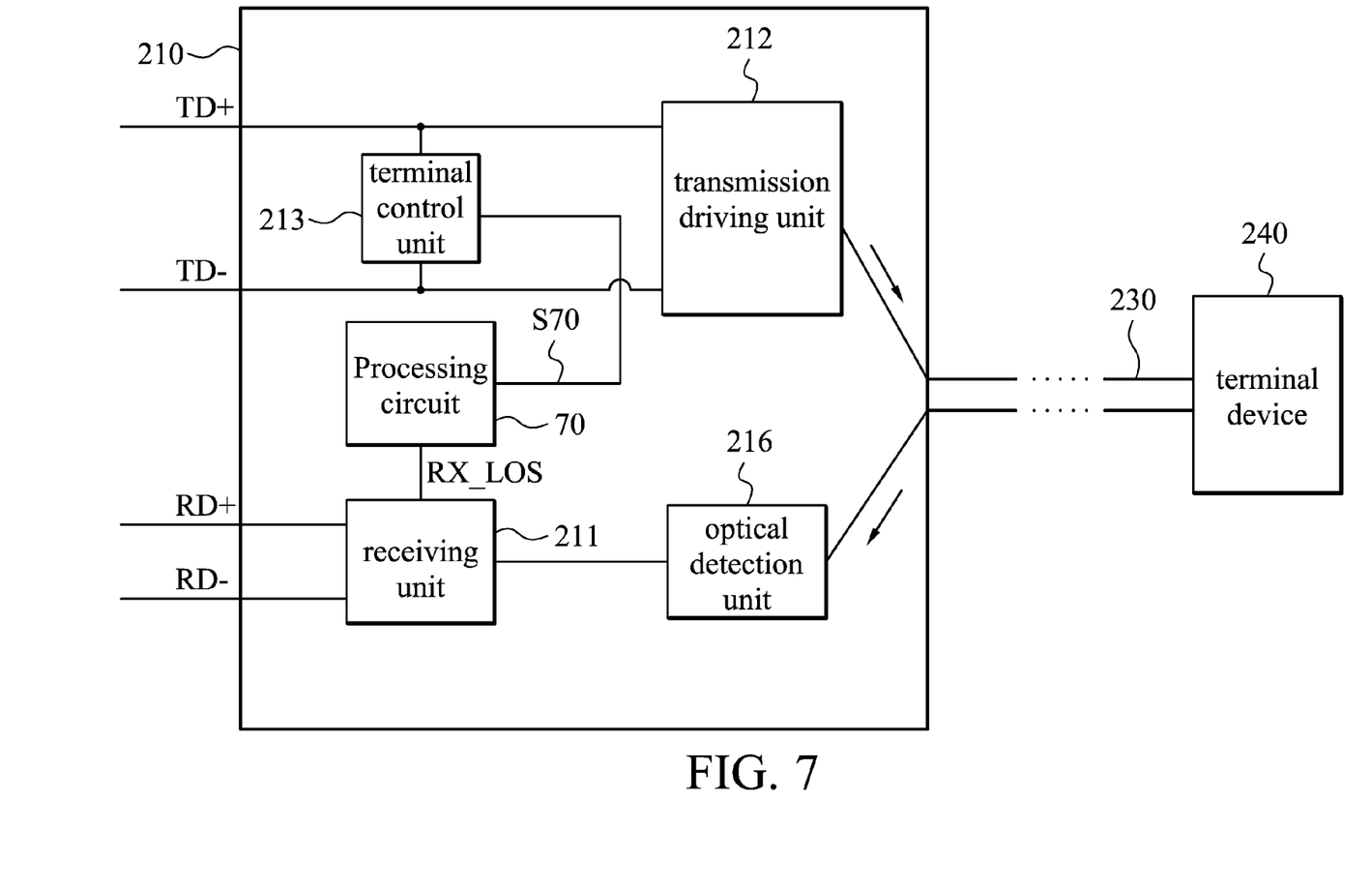
FIG. 7 shows another exemplary embodiment of an optical transceiver module.

In the optical transceiver module 210, the terminal control unit 213 can receive the receiver lost signal RX_LOS and controls whether a differential terminator impedance is coupled between the positive receiving signal terminal TD+ and the negative receiving signal terminal TD− according to the receiver lost signal RX_LOS. Through dynamic control, the differential terminator impedance can be coupled or not coupled between the positive receiving signal terminal TD+ and the negative receiving signal terminal TD− of the optical transceiver module 210. An electronic transceiver, coupled to the optical transceiver module 210, performs polling to correctly detect whether a differential terminator impedance is present to know the connection status of the terminal device 240. Thus, when the optical transceiver module 210 is not coupled to the terminal device 240 or when the terminal device 240 is not ready for data transmission, the electronic transceiver can not issue a link training sequence to prevent the electronic transceiver from entering a disable mode. In an alternate embodiment, as shown in FIG. 7, before the receiver lost signal RX_LOS is input to the terminal control unit 213, there is a processing circuit 70 which performs a front-end process to the receiver lost signal RX_LOS to generate an indication signal S70 to the terminal control unit 213 to indicate whether the terminal device 240 is coupled to the optical transceiver module 210 and ready for data transmission.

Figure 3:
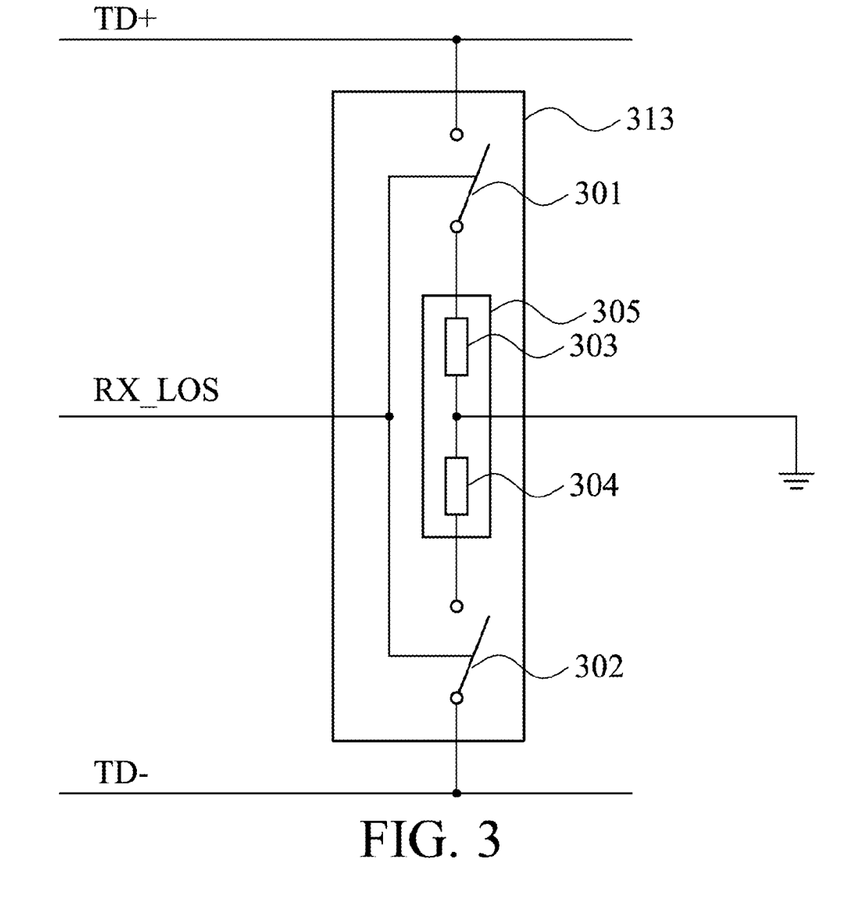
FIG. 3 shows one exemplary embodiment of a terminal control unit.

FIG. 3 shows one exemplary embodiment of a terminal control unit 313. The terminal control unit 313 includes a terminator impedance unit 305, a first terminator impedance switch 301, and a second terminator impedance switch 302. The terminator impedance unit 305 includes a first terminator impedance 303 and a second terminator impedance 304. The first terminator impedance 303 and the second terminator impedance 304 are coupled to a reference potential to form a differential terminator impedance. For example, the reference potential is a ground. The first terminator impedance switch 301 is coupled to the first terminator impedance 303. When the receiver lost signal RX_LOS is asserted, the first terminator impedance switch 301 is turned off, and the first terminator impedance 303 is not coupled between the positive receiving signal terminal TD+ and the reference potential. When the receiver lost signal RX_LOS is de-asserted, the first terminator impedance switch 301 is turned on, and the first terminator impedance 303 is coupled between the positive receiving signal terminal TD+ and the reference potential. The second terminator impedance switch 302 is coupled to the second terminator impedance 304. When the receiver lost signal RX_LOS is asserted, the second terminator impedance switch 302 is turned off, and the second terminator impedance 304 is not coupled between the negative receiving signal terminal TD− and the reference potential. When the receiver lost signal RX_LOS is de-asserted, the second terminator impedance switch 302 is turned on, and the second terminator impedance 304 is coupled between the negative receiving signal terminal TD− and the reference potential. In an embodiment, the first and second terminator impedance switches 301 and 302 can be implemented by metal-oxide-semiconductor field-effect transistors (MOSFETs), and the type of the MOSFETs and driving methods can be determined according to the level of the effective potential of the receiver lost signal RX_LOS. The MOSFETs and the related driving methods are known by one skilled in the art, and, thus, related descriptions are omitted here.

Figure 4:
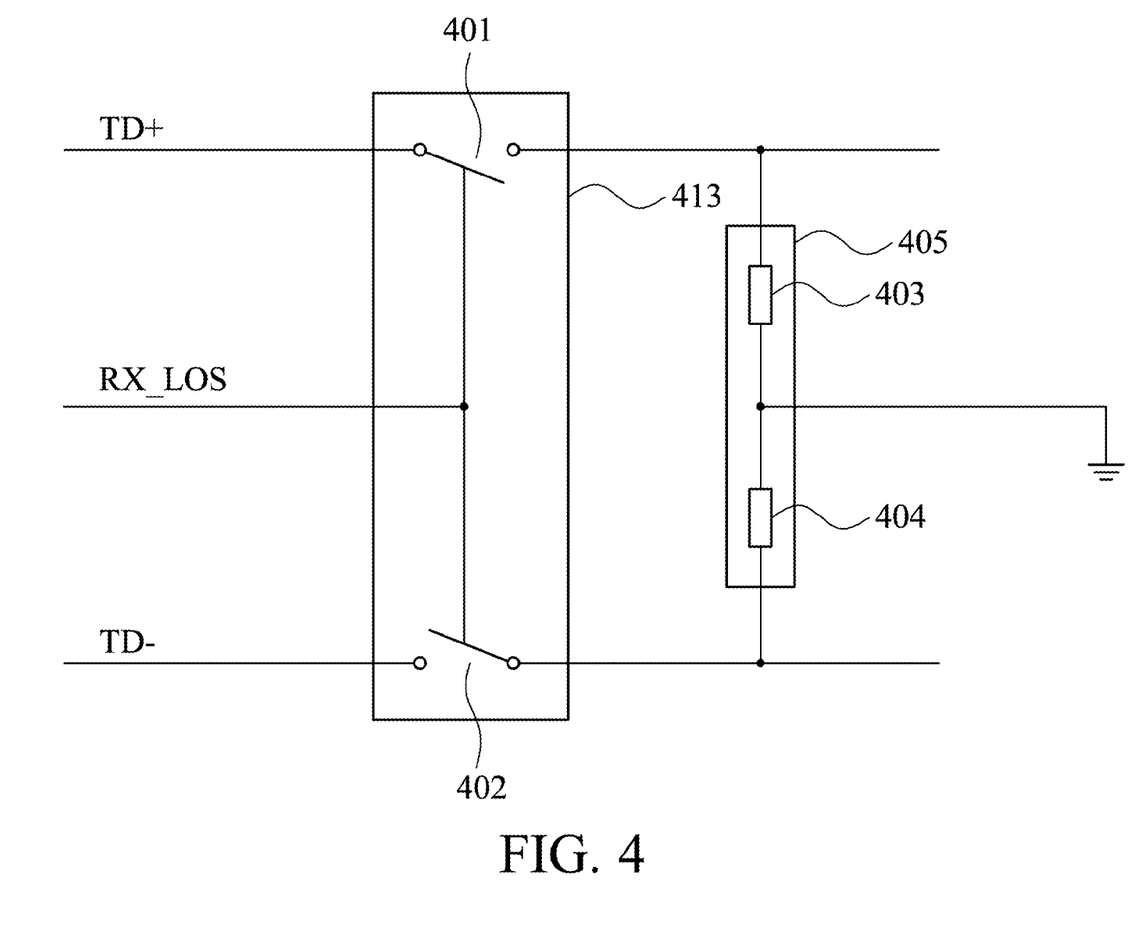
FIG. 4 shows another exemplary embodiment of a terminal control unit.

FIG. 4 shows another exemplary embodiment of a terminal control unit 413. The terminal control unit 413 is coupled between the positive receiving signal terminal TD+ and the negative receiving signal terminal TD− and controls whether a differential terminator impedance is coupled between the positive receiving signal terminal TD+ and the negative receiving signal terminal TD− according to the receiver lost signal RX_LOS. In the embodiment, a differential terminator impedance 405 is fixed in the optical transceiver module and composed by two terminator impedances 403 and 404. The terminator impedances 403 and 404 are coupled to a reference potential. For example, the reference potential is a ground. The terminal control unit 413 includes a first signal switch 401 and a second signal switch 402. The first signal switch 401 and the second signal switch 402 can be independent circuit elements and directly control whether the differential terminator impedance 405 is coupled between the positive receiving signal terminal TD+ and the negative receiving signal terminal TD−. When the receiver lost signal RX_LOS is asserted, the first signal switch 401 is turned off, so that the positive receiving signal terminal TD+ is not coupled to the differential terminator impedance 405. At the same time, the second signal switch 402 is also turned off, so that the negative receiving signal terminal TD− is not coupled to the differential terminator impedance 405. When the receiver lost signal RX_LOS is de-asserted, the first signal switch 401 is turned on, so that the positive receiving signal terminal TD+ is coupled to the differential terminator impedance 405. At the same time, the second signal switch 402 is also turned on, so that the negative receiving signal terminal TD− is coupled to the differential terminator impedance 405. When the differential terminator impedance 405 is coupled between the positive receiving signal terminal TD+ and the negative receiving signal terminal TD−, the optical transceiver module 210 of FIG. 2 can be detected by the electronic transceiver which is coupled to the optical transceiver module 210. In the embodiment, the first signal switch 401 and the second signal switch 402 serving as independent circuit elements can be implemented by signal switches, such as high-speed active switches or high-speed passive switches.

Figure 5:
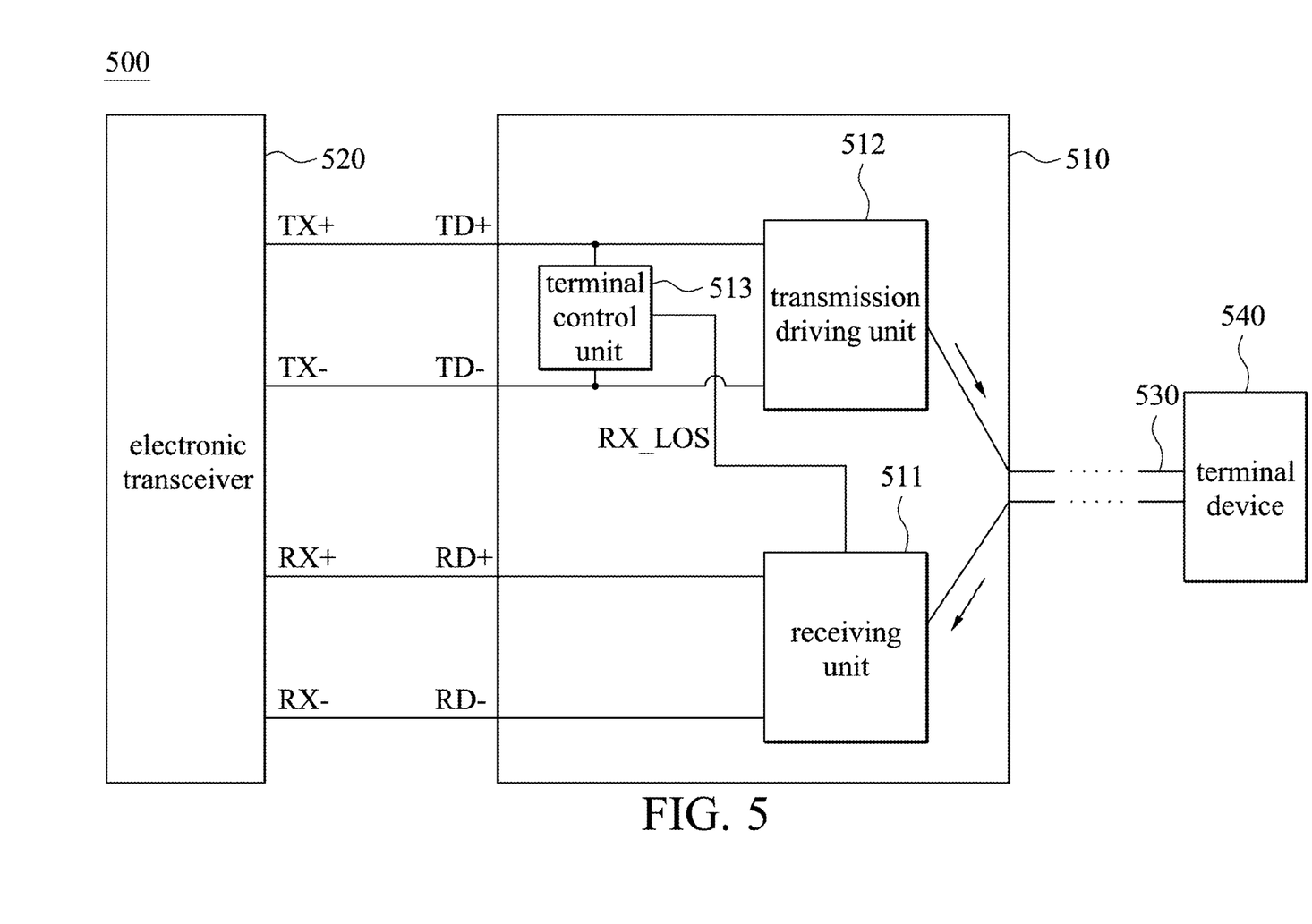
FIG. 5 is an exemplary embodiment of an optical transceiver system.

FIG. 5 is an exemplary embodiment of an optical transceiver system. An optical transceiver system 500 includes an electronic transceiver 520 and an optical transceiver module 510. The electronic transceiver 520 includes a positive transmitting signal terminal TX+ and a negative transmitting signal terminal TX−. The optical transceiver module 510 is coupled to the electronic transceiver 520. The optical transceiver module 510 further includes a receiving unit 511, a transmission driving unit 512, and a terminal control unit 513. The receiving unit 511 outputs a receiver lost signal RX_LOS. The transmission driving unit 512 includes a positive receiving signal terminal TD+ and a negative receiving signal terminal TD− which are coupled to the positive transmitting signal terminal TX+ and the negative transmitting signal terminal TX− of the electronic transceiver 520, respectively, so that data may be sent from the electronic transceiver 520 to the optical transceiver module 510, wherein the data sent from the electronic transceiver 520 to the optical transceiver module 510 can be sent in a form of a differential signal pair. The terminal control unit 513 is coupled between the positive receiving signal terminal TD+ and the negative receiving signal terminal TD− and controls whether a differential terminator impedance is coupled between the positive receiving signal terminal TD+ and the negative receiving signal terminal TD− according to the receiver lost signal RX_LOS. In order to accomplish the two-way communication with the electronic transceiver 520, the receiving unit 511 of the optical transceiver module 510 further includes a positive transmitting signal terminal RD+ and a negative transmitting signal terminal RD− which are coupled to a positive receiving signal terminal RX+ and a negative receiving signal terminal RX− of the electronic transceiver 520 so that data may be sent from the optical transceiver module 510 to the electronic transceiver 520, wherein the data sent from the optical transceiver module 510 to the electronic transceiver 520 can be sent in a form of a differential signal pair. The optical transceiver module 520 can be coupled to a terminal device 540 through an optical cable 530. The electronic transceiver 520 may be a high-speed electronic transceiver with a PCI-e interface or a USB 3.0 interface which supports a hot plugging function. The electronic transceiver 520 in the embodiment may be a host apparatus which includes positive and negative transmitting signal terminals TX+/TX− for transmitting a differential signal pair and positive and negative receiving signal terminals RX+/RX− for receiving a differential signal pair, and the invention is not limited to a high-speed electronic transceiver with a PCI-e interface or a USB 3.0 interface.

When the optical transceiver module 510 is coupled to the electronic transceiver 520 by the connection shown in FIG. 5 and the optical transceiver module 510 is not coupled to any terminal device, the receiver lost signal RTX-LOS output by the receiving unit 511 is asserted. The terminal control unit 513 controls a differential terminator impedance to be not coupled between the positive receiving signal terminal TD+ and the negative receiving signal terminal TD− according to the asserted receiver lost signal RX_LOS. The electronic transceiver 520 performs polling to detect whether a differential terminator impedance is coupled between the positive transmitting signal terminal TX+ and the negative transmitting signal terminal TX− to determine whether the terminal device 540 has been inserted. At this time, since the electronic transceiver 520 does not detect that a differential terminator impedance is present, the electronic transceiver 520 determines that the terminal device 540 has not been inserted and does not issue a link training sequence. When the optical transceiver 510 is coupled to the electronic transceiver 520 and also to the terminal device 540 but the terminal device 540 is not ready for data transmission, the receiver lost signal RX_LOS is still asserted. During this time, there is still no differential terminator impedance coupled between the positive receiving signal terminal TD+ and the negative receiving signal terminal TD−. Thus, the electronic transceiver 520 does not issue a link training sequence. When the optical transceiver module 510 is coupled to the electronic transceiver 520 and also to the terminal device 540 and the terminal device 540 is ready for data transmission, the receiver lost signal RX_LOS is de-asserted. A differential terminator impedance is coupled between the positive receiving signal terminal TD+ and the negative receiving signal terminal TD− of the optical transceiver module 510. At this time, the electronic transceiver 520 detects that there is a differential terminator impedance coupled between the positive receiving signal terminal TD+ and the negative receiving signal terminal TD− and then issues a link training sequence to build a link to the device terminal 540.

Figure 6:
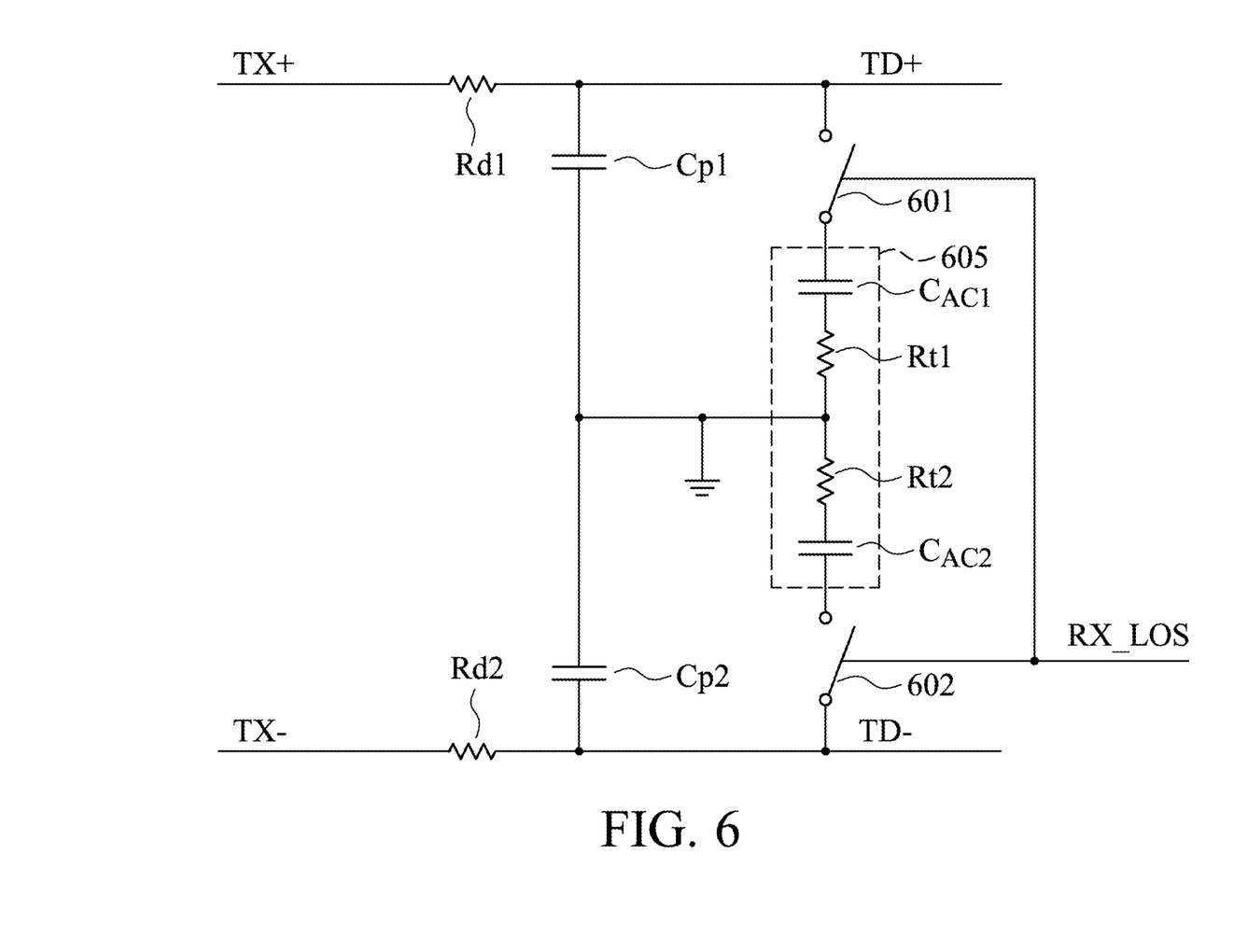
FIG. 6 shows an exemplary embodiment of detection of a differential terminator impedance performed by an electronic transceiver in an optical transceiver system by performing polling.

FIG. 6 shows an exemplary embodiment of detection of a differential terminator impedance performed by an electronic transceiver in an optical transceiver system by performing polling. As described above, a positive receiving signal terminal TD+ and a negative receiving signal terminal TD− of an optical transceiver module are coupled to a positive transmitting signal terminal TX+ and a negative transmitting signal terminal TX− of the electronic transceiver, respectively. The electronic transceiver performs polling to detect whether there is a differential terminator impedance coupled between the positive transmitting signal terminal TX+ and the negative transmitting signal terminal TX− to determine whether a terminal device has been inserted according to the detection result. The electronic transceiver performs the polling operation in a predetermined time period to determine whether to issue a link training sequence. As shown in FIG. 5, when the electronic transceiver performs the polling to detect whether there is a differential terminator impedance coupled between the positive transmitting signal terminal TX+ and the negative transmitting signal terminal TX−, the electronic transceiver charges a common mode voltage between the positive transmitting signal terminal TX+ and a ground and a common mode voltage between the negative transmitting signal terminal TX− and the ground to a specific value and then discharges them. According to a discharging time for which the common mode voltages have been discharged to a threshold value from the specific value, the electronic transceiver detects whether there is a differential terminator impedance coupled between the positive transmitting signal terminal TX+ and the negative transmitting signal terminal TX−. When the electronic transceiver is not coupled to any terminal device, since a charging resistor Rd1 and a parasitical capacitor Cp1 are inherently present between the positive transmitting signal terminal TX+ and the ground, a charging path is formed by the charging resistor Rd1 and the parasitical capacitor Cp1. Moreover, at the same time, since a charging resistor Rd2 and a parasitical capacitor Cp2 are inherently present between the positive transmitting signal terminal TX+ and the ground, another charging path is formed by the charging resistor Rd2 and the parasitical capacitor Cp2. In this situation, the discharging time is t1. When a terminal device is inserted and ready for data transmission, terminator impedance switches 601 and 602 of the embodiment are turned on. A differential terminator impedance of a differential terminator impedance unit 605 is coupled between the positive receiving signal terminal TD+ and the negative receiving signal terminal TD−. For example, as shown in FIG. 6, a terminal resistor Rt1 and an AC capacitor $C_{AC1}$ are coupled between the positive receiving signal terminal TD+ of the optical transceiver module and the ground, and a terminal resistor Rt2 and an AC capacitor $C_{AC2}$ are coupled between the negative receiving signal terminal TD− of the optical transceiver module and the ground. At this time, a discharging path is formed by the charging resistor Rd1 and the parasitical capacitor Cp1 and the terminal resistor Rt1 and the AC capacitor $C_{AC1}$ which are coupled to the parasitical capacitor Cp1 in parallel, and another discharging path is formed by the charging resistor Rd2 and the parasitical capacitor Cp2 and the terminal resistor Rt2 and the AC capacitor $C_{AC2}$ which are coupled to the parasitical capacitor Cp2 in parallel. Since the RC constant of the circuitry is changed at this time, the discharging time is changed to t2. The electronic transceiver can detect whether there is a differential terminator impedance coupled between the positive transmitting signal terminal TX+ and the negative transmitting signal terminal TX− according to the change of the discharging time to determine whether a terminal device has been inserted according to the detection result.

An exemplary embodiment of an optical transceiving method is further provided. The optical transceiving method is applied to an optical transceiver system 500 as shown in FIG. 5. In the optical transceiving method, a receiver lost signal RX_LOS is output according to a state of the terminal device 540. Whether a differential terminator impedance is coupled between the positive receiving signal terminal TD+ and the negative receiving signal terminal TD− is controlled according to the receiver lost signal RX_LOS. When the terminal device 540 is coupled to the optical transceiver module 510 and ready for data transmission, the receiver lost signal RX_LOS is de-asserted. When the terminal device 540 is not coupled to the optical transceiver module 510 or when the terminal device 540 is not ready for data transmission, the receiver lost signal RX_LOS is asserted. When the receiver lost signal RX_LOS is de-asserted, there is a differential terminator impedance coupled between the positive receiving signal terminal TD+ and the negative receiving signal terminal TD−.

According to the optical transceiver module and system and the optical transceiving method of the embodiments, controlling a differential terminator impedance to be dynamically coupled between the positive and negative receiving signal terminals of the optical transceiver module according to the connection status of the terminal device can be accomplished on the inside of the optical transceiver module. Further, according to the coupling of the differential terminator impedance, the electronic transceiver in the host can accurately obtain the connection status of the terminal device coupled to the end of the optical cable. Through the optical transceiver module and the system of the embodiments, electronic transceivers which are originally not coupled to an optical transceiver can perform optical fiber communication with a terminal device, and the terminal device can perform a hot plugging function. According to the embodiments, the original interface design of the electronic transceiver in the host is not required to be changed. In the optical transceiver module in the embodiments, since the receiver lost signal is an internal signal, it is not required to design a pin to output the receiver lost signal externally from the interface of the optical transceiver module; which decreases the pin count of the optical transceiver module.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical transceiver module comprising:
   a receiving unit outputting a receiver lost signal;
   a transmission driving unit comprising a positive receiving signal terminal and a negative receiving signal terminal;
   a first terminator impedance;
   a second terminator impedance, wherein the first terminator impedance and the second terminator are directly connected to a reference potential to form a differential terminator impedance;
   a first signal switch coupled between the positive receiving signal terminal and the first terminator impedance and controlling whether the positive receiving signal terminal is coupled to the first terminator impedance according to the receiver lost signal; and
   a second signal switch coupled between the negative receiving signal and the second terminator impedance and controlling whether the negative receiving signal terminal is coupled to the second terminator impedance according to the receiver lost signal;
   wherein when the optical transceiver module is coupled to an electronic transceiver through the positive receiving signal terminal and the negative receiving signal terminal and the differential terminator impedance is coupled between the positive receiving signal terminal and the negative receiving signal terminal, the electronic transceiver issues a link training sequence.

2. The optical transceiver module as claimed in claim 1, wherein when a terminal device is coupled to the optical transceiver module through an optical cable and ready for data transmission, the receiver lost signal is de-asserted.

3. The optical transceiver module as claimed in claim 2, wherein when the terminal device is not coupled to the optical transceiver module or when the terminal device is not ready for data transmission, the receiver lost signal is asserted.

4. The optical transceiver module as claimed in claim 1, wherein when the receiver lost signal is de-asserted, the differential terminator impedance is coupled between the positive receiving signal terminal and the negative receiving signal terminal.

5. The optical transceiver module as claimed in claim 1 further comprises a processing circuit which performs a front-end process to the receiver lost signal to generate an indication signal to the terminal control unit.

6. An optical transceiver system comprising:
   an electronic transceiver comprising a positive transmitting signal terminal and a negative transmitting signal terminal; and
   an optical transceiver module capable of being coupled to the electronic transceiver and comprising:
   a receiving unit outputting a receiver lost signal;
   a transmission driving unit comprising a positive receiving signal terminal and a negative receiving signal terminal which are coupled to the positive transmitting signal terminal and the negative transmitting signal terminal respectively;
   a first terminator impedance;
   a second terminator impedance, wherein the first terminator impedance and the second terminator are directly connected to a reference potential to form a differential terminator impedance;
   a first signal switch coupled between the positive receiving signal terminal and the first terminator impedance and controlling whether the positive receiving signal terminal is coupled to the first terminator impedance according to the receiver lost signal; and
   a second signal switch coupled between the negative receiving signal and the second terminator impedance and controlling whether the negative receiving signal terminal is coupled to the second terminator impedance according to the receiver lost signal;
   wherein when the differential terminator impedance is coupled between the positive receiving signal terminal and the negative receiving signal terminal, the electronic transceiver issues a link training sequence.

7. The optical transceiver system as claimed in claim 6, wherein when a terminal device is coupled to the optical transceiver module through an optical cable and ready for data transmission, the receiver lost signal is de-asserted.

8. The optical transceiver system as claimed in claim 7, wherein when the terminal device is not coupled to the optical transceiver module or when the terminal device is not ready for data transmission, the receiver lost signal is asserted.

9. The optical transceiver system as claimed in claim 6, wherein when the receiver lost signal is de-asserted, the differential terminator impedance is coupled between the positive receiving signal terminal and the negative receiving signal terminal.

10. The optical transceiver system as claimed in claim 6 further comprises a processing circuit which performs a front-end process to the receiver lost signal to generate an indication signal to the terminal control unit.

\* \* \* \* \*